(12) United States Patent
Dueweke (10) Patent No.: US 7,502,157 B1
(45) Date of Patent: Mar. 10, 2009

(54) MULTI-LAYER SPATIAL LIGHT MODULATOR FOR AMPLITUDE AND PHASE CONTROL

(75) Inventor: Michael J. Dueweke, Santa Clara, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 31 days.

(21) Appl. No.: 11/391,932

(22) Filed: Mar. 28, 2006

(51) Int. Cl.
*G02F 1/01* (2006.01)
(52) U.S. Cl. ...................................... 359/276
(58) Field of Classification Search ................. 359/276, 359/279, 291, 292, 293, 295, 298, 220, 223, 359/224
See application file for complete search history.

(56) References Cited

U.S. PATENT DOCUMENTS 5,766,829 A 6/1998 Cathey, Jr. et al.

7,042,622 B2 * 5/2006 Huibers et al. .............. 359/291

OTHER PUBLICATIONS

Jahja I. Trisnadi, et al., "Overview and Applications of Grating Light Valve Based Optical Write Engines for High-Speed Digital Imaging", Photonics West 2004—Micromachining and Microfabrication Symposium, Jan. 26, 2004, pp. 1-13, California, USA.

* cited by examiner

*Primary Examiner*—Hung X. Dang
*Assistant Examiner*—Tuyen Q Tra
(74) *Attorney, Agent, or Firm*—William E. Nuttle (57) ABSTRACT

One embodiment relates to a method of independently controlling amplitude and phase modulation by a spatial light modulator. Light is illuminated onto upper layer deflectable planar areas and lower layer deflectable planar areas over a substrate of the spatial light modulator. First active circuitry on the substrate is used to provide amplitude modulation by controlling a relative displacement between upper layer deflectable planar areas and adjacent lower layer deflectable planar areas. Second active circuitry on the substrate is used to provide phase modulation by controlling a displacement between the (upper and lower layer) deflectable planar areas and the substrate. Other embodiments and features are also disclosed.

11 Claims, 9 Drawing Sheets

(Cross-sectional View)

FIG. 1

FIG. 2
(Top-down View)

FIG. 3A
(Top-down View of Lower Layer)

FIG. 3B
(Top-down View of Upper Layer)

FIG. 3C
(Cross-sectional View)

FIG. 4
(Top-down View)

FIG. 5A
(Top-down View of Lower Layer)

FIG. 5B
(Top-down View of Upper Layer)

FIG. 5C
(Cross-sectional View)

MULTI-LAYER SPATIAL LIGHT MODULATOR FOR AMPLITUDE AND PHASE CONTROL

GOVERNMENT LICENSE RIGHTS

The U.S. Government has a paid-up license in this invention and the right in limited circumstances to require the patent owner to license others on reasonable terms as provided for by the terms of contract No. N66001-04-C-8029 awarded by The Department of the Navy, Space and Naval Warfare Systems Command (SPAWAR) Division, in cooperation with the Defense Advanced Research Projects Agency (DARPA).

CROSS-REFERENCE TO RELATED APPLICATIONS

The present application is related to U.S. patent application Ser. No. 11/165,399, entitled "Complex Spatial Light Modulator," filed Jun. 22, 2005 by inventors Jahja I. Trisnadi et al.

TECHNICAL FIELD

The present disclosure relates generally to spatial light modulators.

BACKGROUND

A spatial light modulator (SLM) includes of an array of optical elements (or pixels) in which each element acts independently to modulate incident light. The incident light beam may be modulated in intensity, phase, polarization or direction. The majority of spatial light modulators are intensity modulators. In such devices, often the intensity modulation causes some phase modulation, but the phase modulation is not typically done independently of the intensity modulation.

An example of an intensity modulation type of SLM is a Grating Light Valve™ (GLV™) device from Silicon Light Machines Corporation of Sunnyvale, Calif. The GLV™ device switches and modulates light intensities via diffraction. The GLV™ device is comprised of many parallel highly-reflective micro-ribbons that are suspended over an air gap above a silicon substrate. When the ribbons of a GLV™ pixel are co-planar, incident light becomes specularly reflected (like a mirror) from the GLV™ pixel. By deflecting alternate ribbons of a GLV™ pixel, the incident light may be controllably diffracted from the GLV™ pixel.

It is highly desirable to improve spatial light modulators for use in a variety of applications.

SUMMARY

One embodiment relates to a multi-layer spatial light modulator device for amplitude and phase control. The device includes a substrate, lower layer deflectable planar areas positioned above the substrate, a lower layer support structure, upper layer deflectable planar areas positioned above the lower layer, and an upper layer support structure. A first portion of incident light impinges on the upper layer of deflectable planar areas, and a second portion of the incident light impinges on the lower layer of deflectable planar areas.

Another embodiment relates to a method of independently controlling amplitude and phase modulation by a spatial light modulator. Light is illuminated onto upper layer deflectable planar areas and lower layer deflectable planar areas over a substrate of the spatial light modulator. First active circuitry on the substrate is used to provide amplitude modulation by controlling a relative displacement between upper layer deflectable planar areas and adjacent lower layer deflectable planar areas. Second active circuitry on the substrate is used to provide phase modulation by controlling a displacement between the (upper and lower layer) deflectable planar areas and the substrate.

Other embodiments and features are also disclosed.

BRIEF DESCRIPTION OF THE DRAWINGS

These and various other features and advantages of the present invention may be apparent upon reading of the following detailed description in conjunction with the accompanying drawings and the appended claims provided below.

DETAILED DESCRIPTION

The present disclosure describes the design, construction and method of use of a multi-level diffractive optical micro-electro-mechanical system (MEMS) device. The multi-level diffractive optical MEMS device is capable of controllably modulating both the amplitude and phase of incident illumination. The device includes at least two deformable layers, preferably located in different planes with respect to the incident illumination.

In accordance with an embodiment of the invention, the structure of the device includes at least one lower layer planar light valve or deformable membrane and at least one upper layer planar light valve or deformable membrane. Both the lower and upper layer planar light valves or deformable membranes are structurally supported by support structures. The support structures for a lower planar light valve or deformable membrane may be attached to or built on an underlying substrate. The support structures for an upper planar light valve or deformable membrane may be attached to or built on 1) the movable portion of the lower layer membrane or light valve, 2) the support structures of the lower layer, and/or 3) the substrate material directly.

Figure 1:
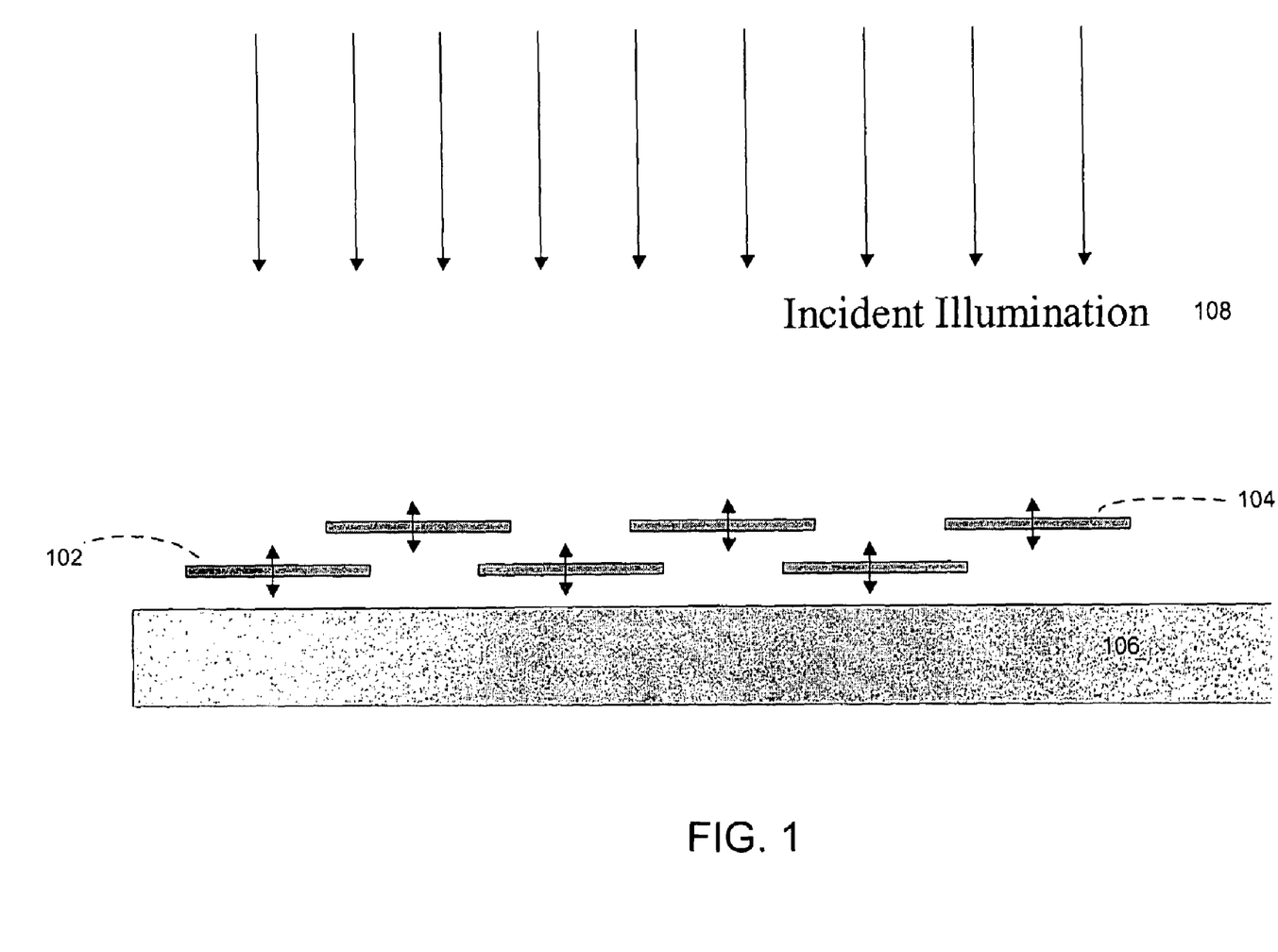
FIG. 1 is a cross-sectional diagram of a multi-layer light valve device for amplitude and phase control of incident light in accordance with an embodiment of the invention.

FIG. 1 is a cross-sectional diagram of a multi-layer light valve device for amplitude and phase control of incident light in accordance with an embodiment of the invention. As shown in FIG. 1, the multi-layer light valve includes a substrate 106, an arrangement or array of lower deformable membranes 102, and an arrangement or array of upper deformable membranes 104. A portion (preferably half) of the incident optical illumination 108 impinges upon the lower deformable membrane array 102, and a portion (preferably half) of the incident illumination 108 impinges upon the upper deformable membrane array 104. For purposes of ease of illustration and understanding, the support structures are not shown in FIG. 1.

The multi-layer light valve device modulates the amplitude of reflected light by changing the deflection of one or a group of the lower deformable membranes 102 with respect to (in relation to) an adjacent one or a group of adjacent upper deformable membranes 104. By doing so, the optical path length difference between the pertinent lower and upper deformable membranes provides for a range of constructive or destructive interference in the reflected illumination so as to controllably modulate the amplitude of reflected light.

The multi-layer light valve device modulates the phase of reflected light by modulating the deflection of one or a group of the lower deformable membranes 102 to the same extent as an adjacent one or a group of adjacent upper deformable membranes 104 while keeping the optical path length difference between the upper and lower membranes constant. In other words, the deflections of the lower membranes 102 and adjacent upper membranes 104 are deflected in parallel to perform the phase modulation. In this way, the multi-layer light valve device may be operated to modulate the phase of reflected illumination in one area of the device with respect to adjacent or other areas of the device (while, if desired, keeping the optical path length difference between upper and lower membranes constant).

The multi-layer light valve device disclosed herein thus provides a means of independently modulating the phase or the amplitude, or a combination of both.

In accordance with a first example implementation, in order to allow for independent modulation of phase and amplitude, the device may be configured to provide for deformation at least three-quarters of the wavelength of incident illumination the upper layer membranes and to provide for deformation at least one-half of the wavelength of incident illumination the lower layer membranes. For the phase modulation, a one-half wavelength range of both the upper and lower layer membranes may be used to create an optical path length variation of up to one full wavelength. For the amplitude modulation, a one-quarter wavelength range of the upper layer membranes may be used to create an optical path length difference of one-half wavelength for modulation between constructive and destructive interference.

In accordance with a second example implementation, the device may be configured to provide for deformation at least one-half of the wavelength of incident illumination the upper layer membranes and to provide for deformation at least three-quarters of the wavelength of incident illumination the lower layer membranes. For the phase modulation, a one-half wavelength range of both the upper and lower layer membranes may be used to create an optical path length variation of up to one full wavelength. For the amplitude modulation, a one-quarter wavelength range of the lower layer membranes may be used to create an optical path length difference of one-half wavelength for modulation between constructive and destructive interference.

Regarding the above two example implementations, there may be process-related reasons why one implementation is preferable over the other.

In one application, by modulating both the phase and amplitude of incident illumination independently, the multi-layer light valve device may be utilized to render holographic displays or for recording in holographic media. The multi-layer light valve device may also be used in other applications.

Figure 2:
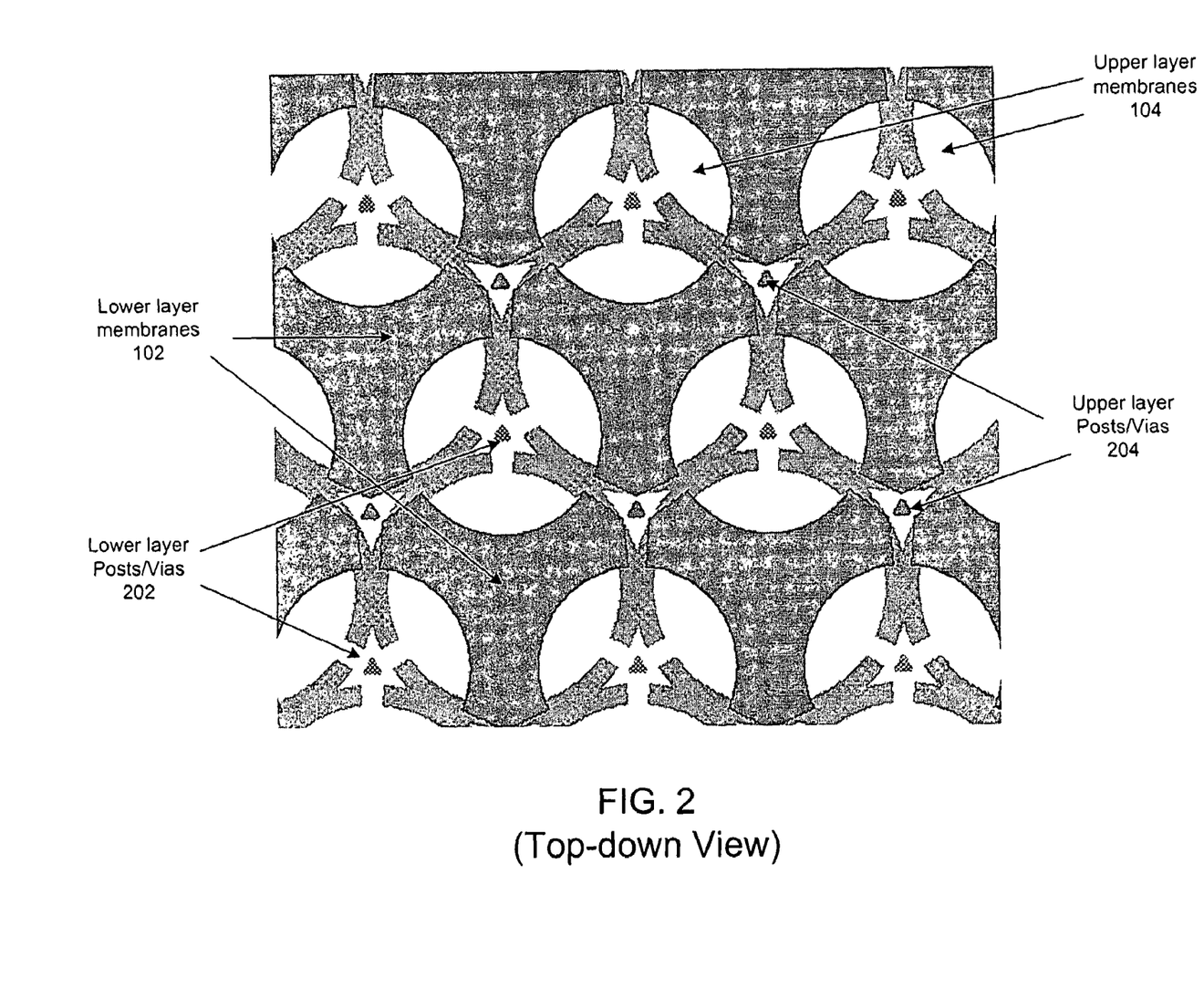
FIG. 2 is a top-down view of a first configuration of a multi-layer light valve device in accordance with an embodiment of the invention.

FIG. 2 is a top-down view of a first configuration of a multi-layer light valve device in accordance with an embodiment of the invention. The surface areas of the lower layer membranes (darker shaded areas) 102 and of the upper layer membranes (white circular areas) 104 are depicted. Support structures are shown super-imposed on the diagram of FIG. 2 for purposes of explanation.

In this embodiment, both the lower layer membranes 102 and the upper layer membranes 104 include circularly-symmetric or circularly-shaped diffracting edges to reduce the polarization dependence of diffraction and efficiency. As shown in FIG. 2, portions of the circularly-shaped lower layer membranes 102 are covered or blocked by the circularly-shaped upper layer membranes 104.

The support structures for the lower layer membranes 102 include lower layer posts/vias 202. In this embodiment, the lower layer posts/vias 202 are positioned underneath centers of the upper layer membranes 104. With this covering of the lower layer support structures by the upper layer membranes, greater optical efficiency is advantageously achieved. The lower layer posts/vias 202 may be attached to or built on the substrate of the device. Hence, the lower layer posts/vias 202 may also advantageously provide an interconnect path or via for the electrical activation (deflection) of the upper layer membranes 104. The lower layer is depicted with further clarity in FIG. 3A.

The support structures for the upper layer membranes 104 include upper layer posts/vias 204. The upper layer is depicted with further clarity in FIG. 3B.

Figure 3A:
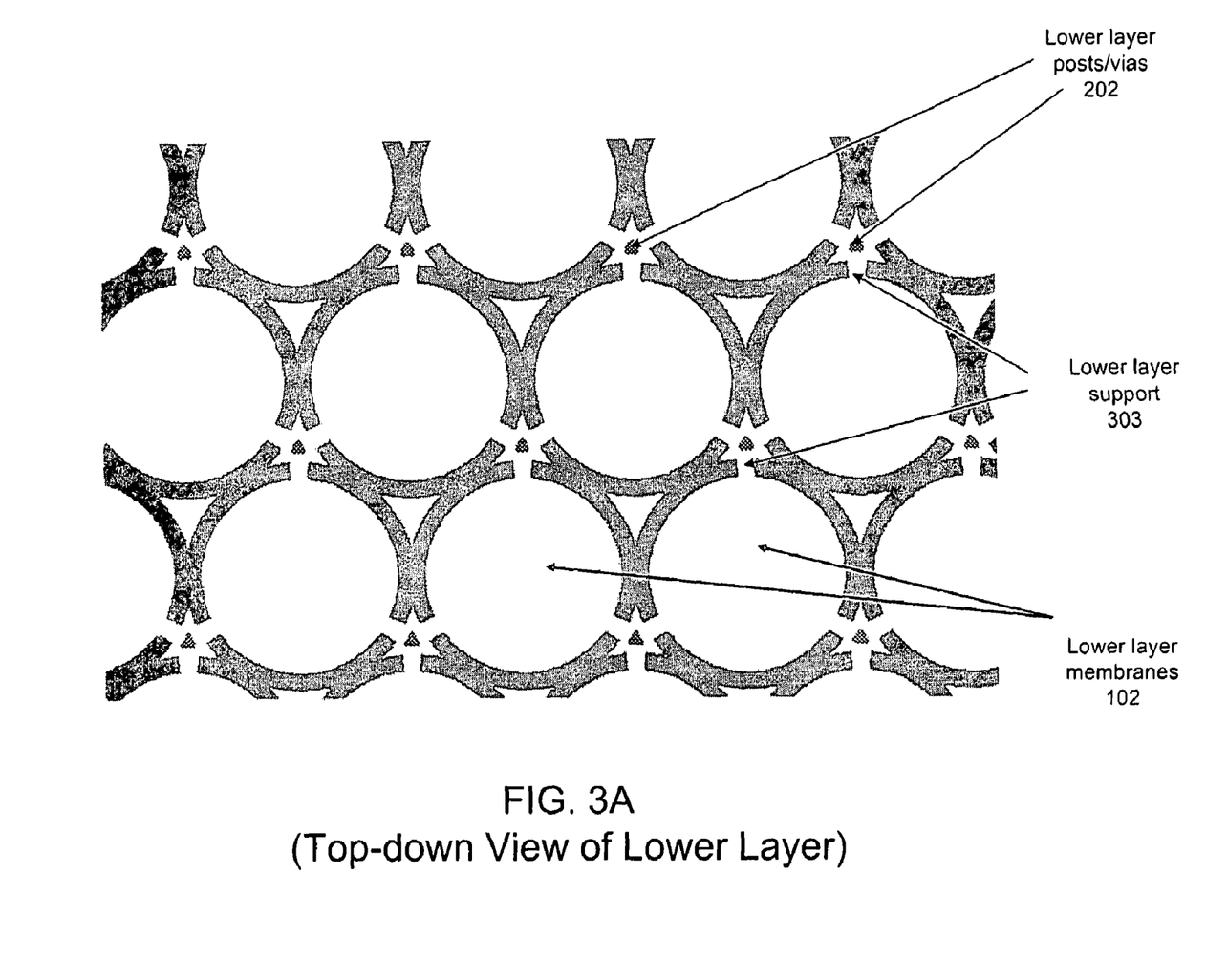
FIG. 3A is a top-down view of a lower layer of the first configuration of a multi-layer light valve device in accordance with an embodiment of the invention.

FIG. 3A is a top-down view of a lower layer of the first configuration of a multi-layer light valve device in accordance with an embodiment of the invention. The circular areas of the lower layer membranes 102 and the triangular-shaped lower layer posts/vias 202 are shown. In addition, further lower layer support structure 302 is shown (in white) which connects the lower layer membranes 102 to the lower layer posts/vias 202.

Figure 3B:
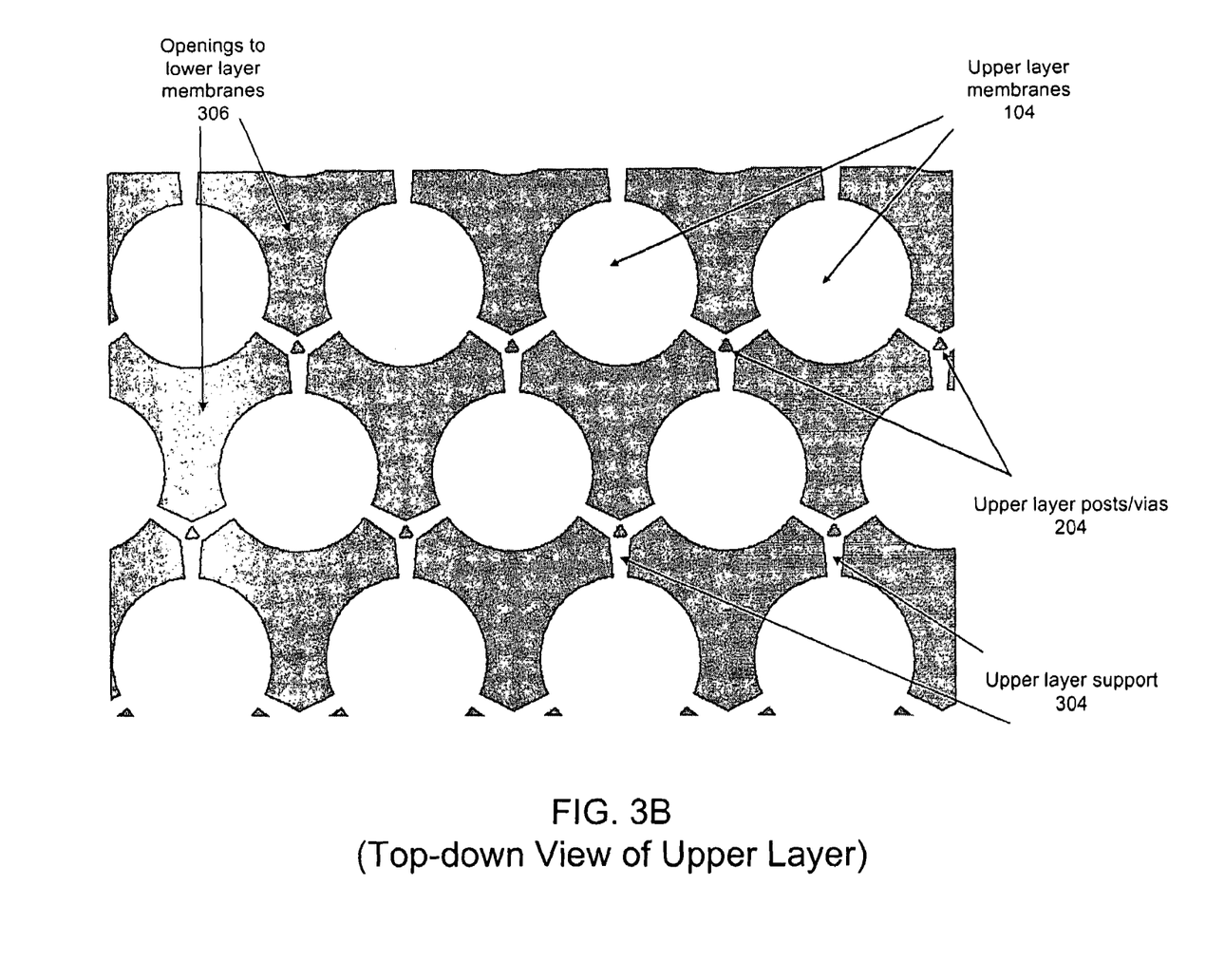
FIG. 3B is a top-down view of an upper layer of the first configuration of a multi-layer fight valve device in accordance with an embodiment of the invention.

FIG. 3B is a top-down view of an upper layer of the first configuration of a multi-layer light valve device in accordance with an embodiment of the invention. The circular areas of the upper layer membranes 104 and the triangular-shaped upper layer posts/vias 204 are shown. In addition, further upper layer support structure 304 is shown (in white) which connects the upper layer membranes 104 to the upper layer posts/vias 204. Also, the openings (darker areas) 306 to the lower layer membranes are depicted.

Figure 3C:
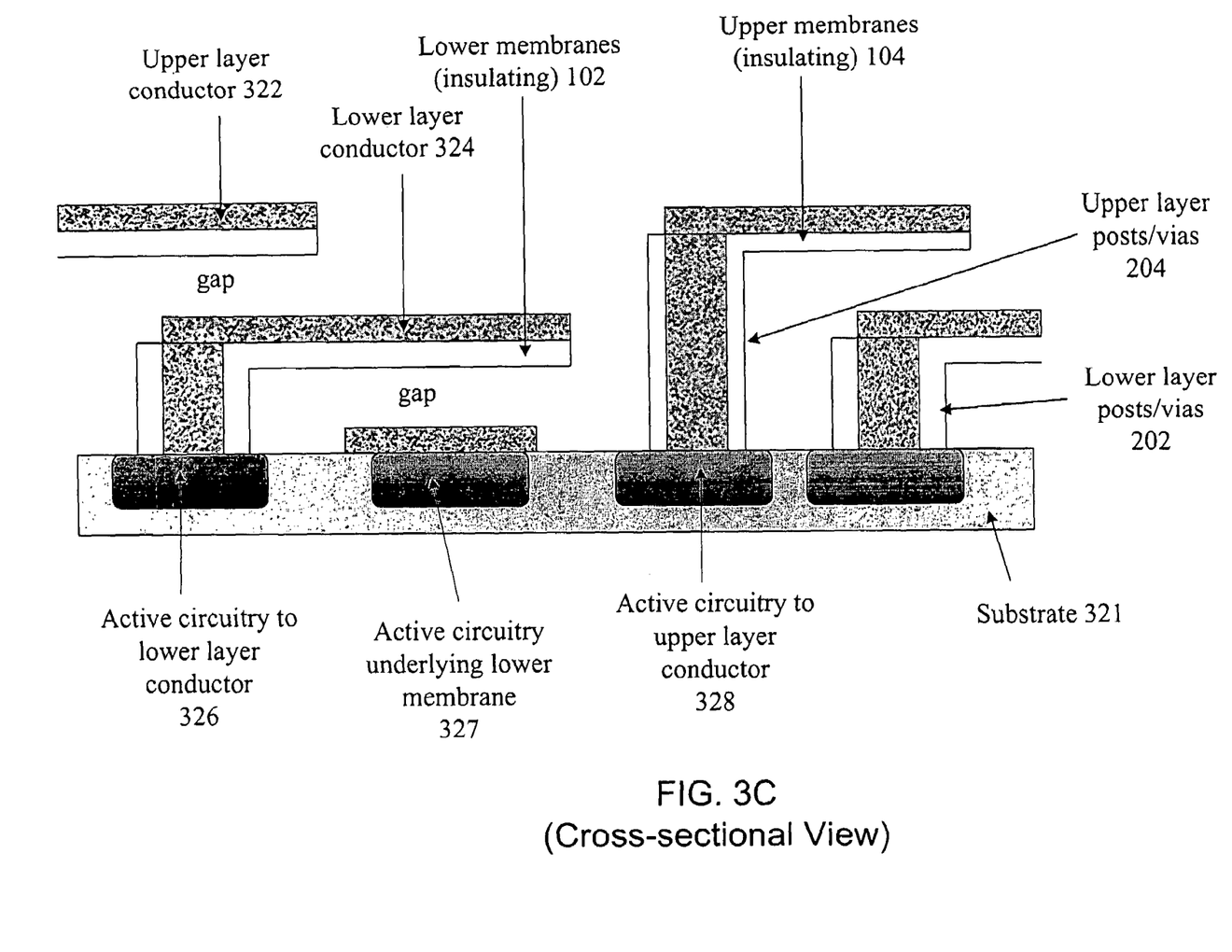
FIG. 3C is a cross-sectional view of the first configuration of a multi-layer light valve device in accordance with an embodiment of the invention.

FIG. 3C is a cross-sectional view of the first configuration of a multi-layer light valve device in accordance with an embodiment of the invention. The cross-sectional view depicted is along a vertical cut on FIG. 2. In FIG. 3C, the insulating membrane material (see 102 and 104) is indicated in white, and the conducting metals (see 322 and 324) are indicated in gray. Open gaps are shown under the insulating membranes. In this embodiment, both the lower layer posts/vias 202 and the upper layer posts/vias 204 are built or fabricated on top of the substrate 321.

In this embodiment, a lower layer membrane 102 may be activated by controlling the voltage difference between the potential applied by the active circuitry 326 to the lower layer conductor 324 on that membrane and the potential applied by the active circuitry 327 underlying that membrane. An upper layer membrane 104 may be activated by controlling the voltage difference between the potential applied by the active circuitry 328 to the upper layer conductor 322 on that membrane and the potential applied by the active circuitry 326 to the lower layer conductor 324 underneath that membrane.

Figure 4:
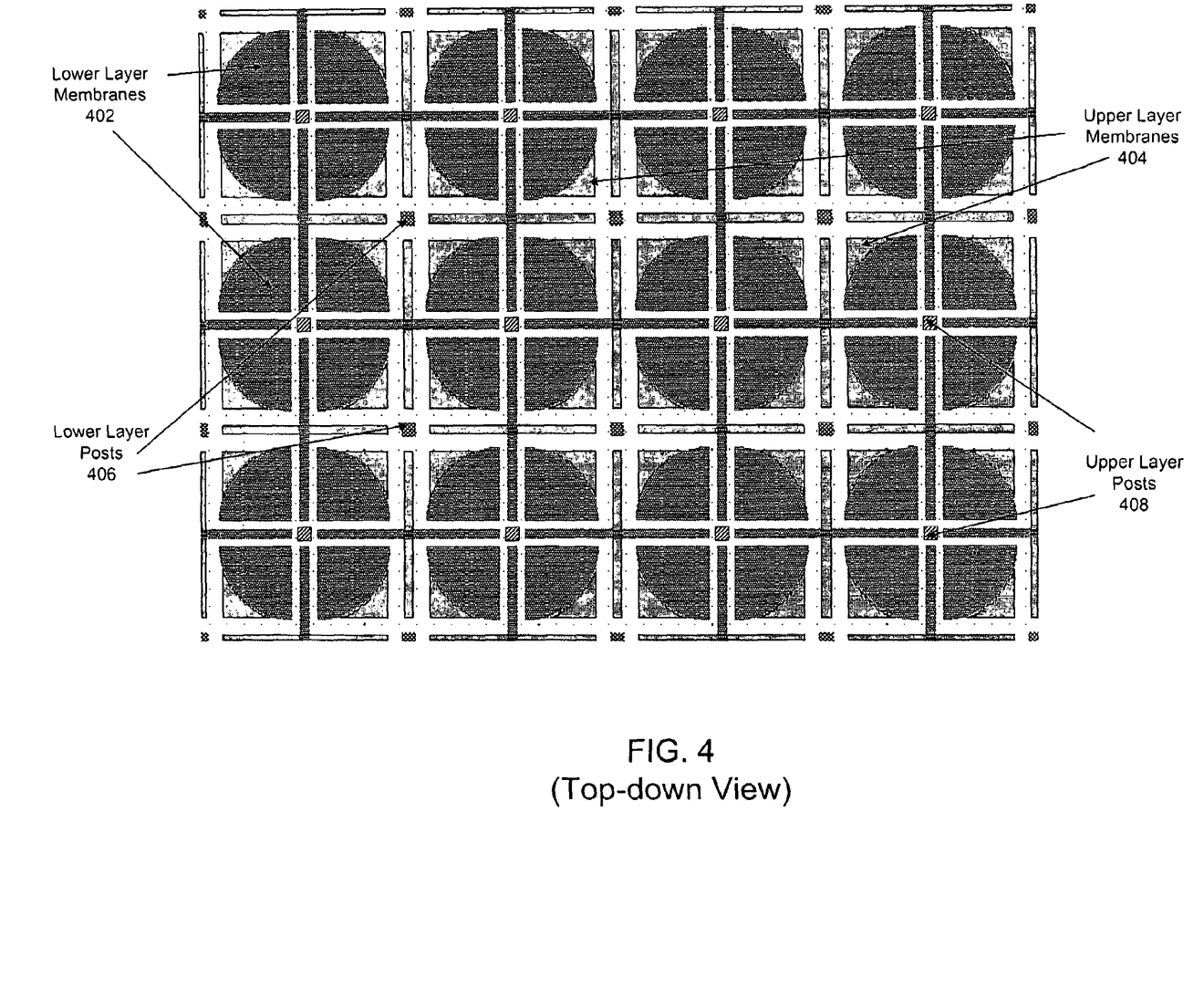
FIG. 4 is a top-down view of a second configuration of a multi-layer light valve device in accordance with an embodiment of the invention.

FIG. 4 is a top-down view of a second configuration of a multi-layer light valve device in accordance with an embodiment of the invention. Here, the lower layer membranes 102 are the medium-shaded circularly-shaped areas, and the upper layer membranes 104 are the darker-shaded nearly-diamond-shaped areas (with curved edges). Support structures are shown super-imposed in the diagram of FIG. 4 for purposes of explanation.

The support structures for the lower layer membranes 402 include lower layer posts/vias 406. In this embodiment, the lower layer posts/vias 406 are positioned underneath centers of the upper layer membranes 404. With this covering of the lower layer support structures by the upper layer membranes, greater optical efficiency is advantageously achieved. The lower layer posts/vias 406 may be attached to or built on the substrate of the device. Hence, the lower layer posts/vias 406 may also advantageously provide an interconnect path or via for the electrical activation (deflection) of the upper layer membranes 404.

The support structures for the upper layer membranes 404 include upper layer posts/vias 408. In this embodiment, these posts 408 may be built or fabricated at or near the centers of the underlying lower membranes 402.

Figure 5A:
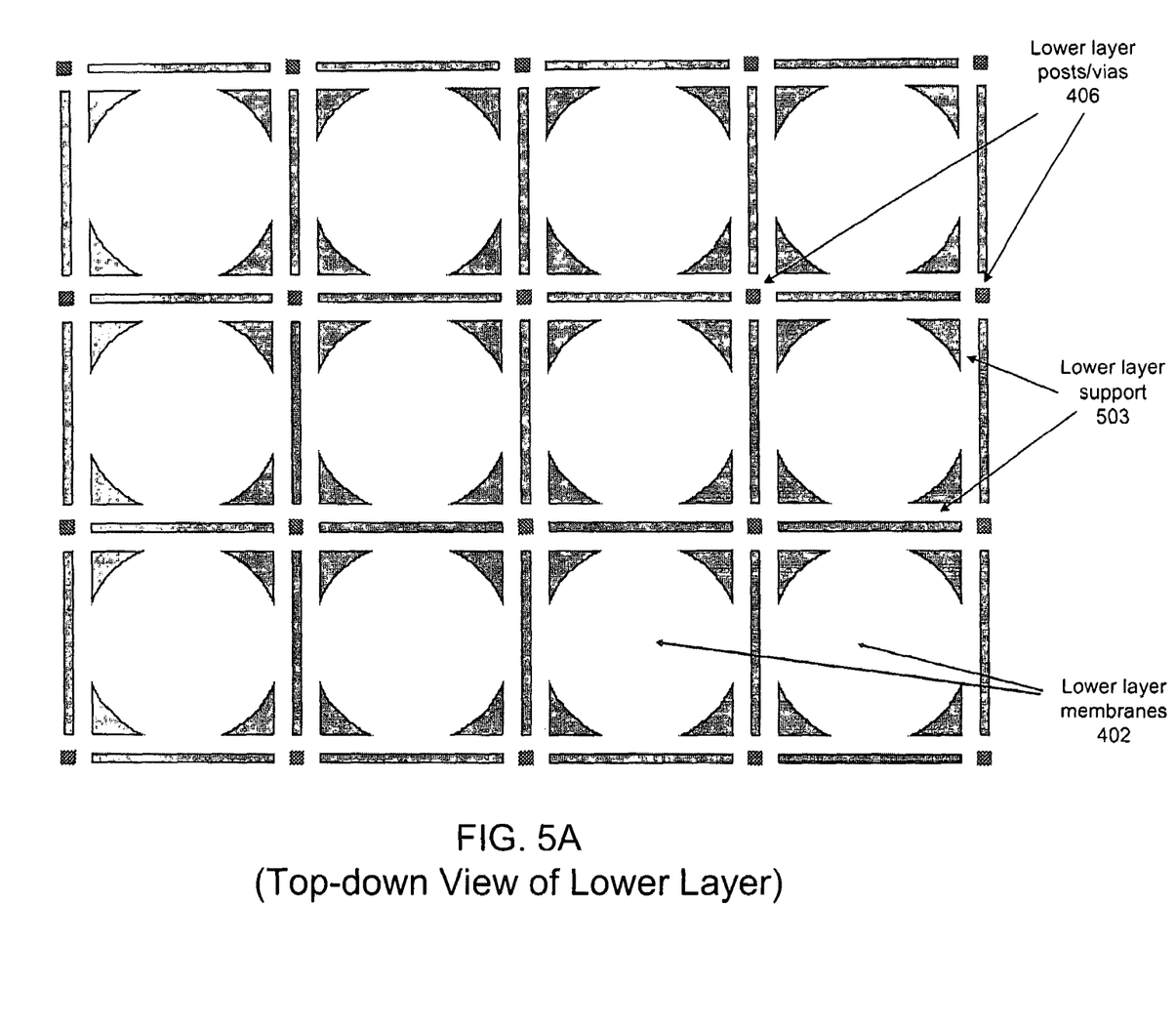
FIG. 5A is a top-down view of a lower layer of the second configuration of a multi-layer light valve device in accordance with an embodiment of the invention.

FIG. 5A is a top-down view of a lower layer of the second configuration of a multi-layer light valve device in accordance with an embodiment of the invention. The circular areas of the lower layer membranes 402 and the square-shaped lower layer posts/vias 406 are shown. In addition, further lower layer support structure 503 is shown (in white) which connects the lower layer membranes 402 to the lower layer posts/vias 406.

Figure 5B:
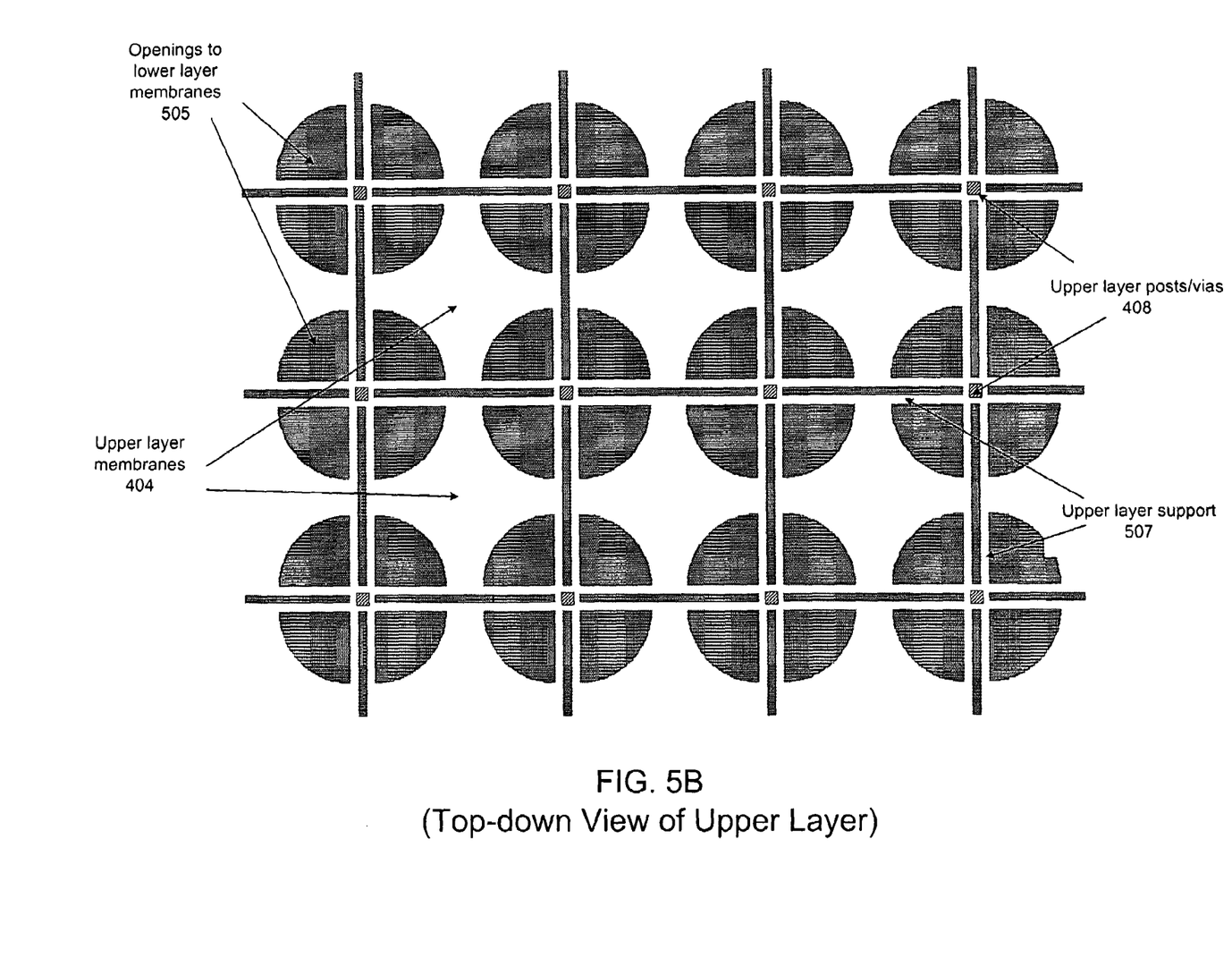
FIG. 5B is a top-down view of an upper layer of the second configuration of a multi-layer light valve device in accordance with an embodiment of the invention.

FIG. 5B is a top-down view of an upper layer of the second configuration of a multi-layer light valve device in accordance with an embodiment of the invention. The areas of the upper layer membranes 404 and the square-shaped upper layer posts/vias 408 are shown. In addition, further upper layer support structure 507 is shown (in white) which connects the upper layer membranes 404 to the upper layer posts/vias 408. Also, the openings (darker areas) 505 to the lower layer membranes are depicted.

Figure 5C:
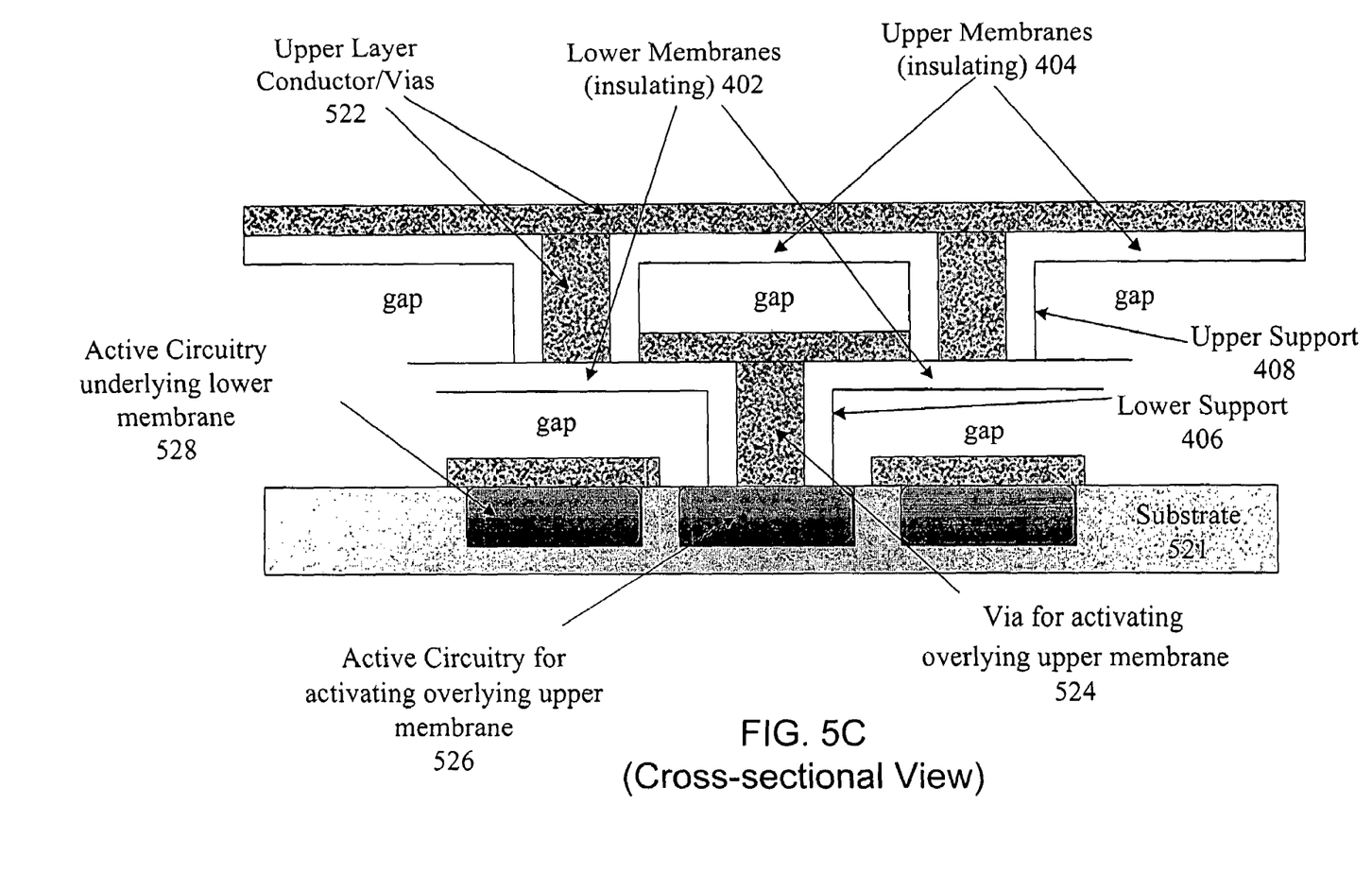
FIG. 5C is a cross-sectional view of the second configuration of a multi-layer light valve device in accordance with an embodiment of the invention.

FIG. 5C is a cross-sectional view of the second configuration of a multi-layer light valve device in accordance with an embodiment of the invention. The cross-sectional view depicted is along a 45 degree diagonal of FIG. 4. In FIG. 5C, the insulating membrane material (see 402 and 404) is indicated in white, and the conducting metals (see 522 and 524) are indicated in gray. Open gaps are shown under the insulating membranes.

In this embodiment, the upper layer support structures 408 are built or fabricated on top of the centers of the lower layer membranes 402. The lower layer support structures 406 are built or fabricated on top of the substrate 521.

In this embodiment, conductive vias 524 through the lower layer support structures 406 may be utilized to contact active circuitry 526 below on the substrate 521 and to so enable activation (i.e. electrostatic deflection) of the upper layer membranes 404. The lower level membranes 402 may be activated by controlling the voltage difference between the active circuitry 528 underlying the lower membranes on the substrate 521 and the upper layer conductor/vias 522.

In one implementation, the activation of the lower membranes 402 may be global for the device or for an area of the device. In this case, the overall phase of reflected illumination for the device (or area of the device) may be controlled by the active circuitry 528 underlying the lower membranes, while the amplitude of the reflected illumination may be independently controlled per pixel separately from the phase modulation by the active circuitry 526 underlying the upper layer membranes.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A multi-layer spatial light modulator device for amplitude and phase control, the device comprising:
a substrate;
lower layer deflectable planar areas positioned above the substrate;
a lower layer support structure for the lower layer deflectable planar areas;
upper layer deflectable planar areas positioned above the lower layer; and
an upper layer support structure for the upper layer deflectable planar areas;
wherein a first portion of incident light impinges on the upper layer of deflectable planar areas, and a second portion of the incident light impinges on the lower layer of deflectable planar areas, and
wherein the lower layer support structure includes lower layer posts positioned underneath the upper layer deflectable planar areas, the lower layer posts include conductive vias coupled to an active circuit on the substrate, and the active circuit is used to control amplitude modulation by controlling a relative displacement between upper layer deflectable planar areas and adjacent lower layer deflectable planar areas.

2. The device of claim 1, wherein the upper layer support structure includes upper layer posts positioned on top of the lower layer deflectable planar areas.

3. The device of claim 2, wherein the upper layer posts include conductive vias coupled to conductive material on the upper layer deflectable planar areas.

4. The device of claim 1, wherein the lower layer deflectable planar areas are circularly shaped.

5. The device of claim 4, wherein the upper layer deflectable planar areas are also circularly shaped.

6. The device of claim 1, wherein the upper layer deflectable planar areas partially overlap in area with the lower layer deflectable planar areas.

7. The device of claim 1, wherein the deflectable planar areas comprise deformable membranes.

8. The device of claim 1, wherein the first and second portions of the incident light are approximately equal.

9. A multi-layer spatial light modulator device for amplitude and phase control, the device comprising:
a substrate;

lower layer deflectable planar areas positioned above the substrate;

a lower layer support structure for the lower layer deflectable planar areas;

upper layer deflectable planar areas positioned above the lower layer; and an upper layer support structure for the upper layer deflectable planar areas, wherein a first portion of incident light impinges on the upper layer of deflectable planar areas, and a second portion of the incident light impinges on the lower layer of deflectable planar areas, and wherein the upper layer support structure includes upper layer posts positioned on top of the lower layer deflectable planar areas, the upper layer posts include conductive vias coupled to conductive material on the upper layer deflectable planar areas, and an active circuit is used to control phase modulation by controlling a displacement between the upper and lower deflectable planar areas and the substrate.

10. A multi-layer spatial light modulator device for amplitude and phase control, the device comprising:

a substrate;

lower layer deflectable planar areas positioned above the substrate;

a lower layer support structure for the lower layer deflectable planar areas;

upper layer deflectable planar areas positioned above the lower layer; and an upper layer support structure for the upper layer deflectable planar areas, wherein a first portion of incident light impinges on the upper layer of deflectable planar areas, and a second portion of the incident light impinges on the lower layer of deflectable planar areas, and wherein the upper layer deflectable planar areas are configured to be deflectable over a range of at least three-quarters of a wavelength of the incident light, and the lower layer deflectable planar areas are configured to be deflectable over a range of at least one-half of the wavelength of the incident light, and wherein a deflection range of at least one-half wavelength for both the upper and lower layer deflectable planar areas is utilized for the phase modulation, and wherein a deflection range of at least one-quarter wavelength for the upper layer deflectable planar area is utilized for the amplitude modulation.

11. A multi-layer spatial light modulator device for amplitude and phase control, the device comprising:

a substrate;

lower layer deflectable planar areas positioned above the substrate;

a lower layer support structure for the lower layer deflectable planar areas;

upper layer deflectable planar areas positioned above the lower layer; and an upper layer support structure for the upper layer deflectable planar areas, wherein a first portion of incident light impinges on the upper layer of deflectable planar areas, and a second portion of the incident light impinges on the lower layer of deflectable planar areas, and wherein the lower layer deflectable planar areas are configured to be deflectable over a range of at least three-quarters of a wavelength of the incident light, and the upper layer deflectable planar areas are configured to be deflectable over a range of at least one-half of the wavelength of the incident light, and wherein a deflection range of at least one-half wavelength for both the upper and lower layer deflectable planar areas is utilized for the phase modulation, and wherein a deflection range of at least one-quarter wavelength for the lower layer deflectable planar area is utilized for the amplitude modulation.

* * * * *